US012701033B2

(12) United States Patent
Venkatapathy et al.

(10) Patent No.: US 12,701,033 B2
(45) Date of Patent: Aug. 4, 2026

(54) FABRIC INTERCONNECT AS A SERVICE IN MIDDLE MILE NETWORK

(71) Applicant: Cisco Technology, Inc., San Jose, CA (US)

(72) Inventors: Venkatraman Venkatapathy, Fremont, CA (US); Balaji Sundararajan, Fremont, CA (US); Giorgio Valentini, Walnut Creek, CA (US); Gokul Krishnan, Milpitas, CA (US); Ankur Bhargava, Pleasanton, CA (US)

(73) Assignee: Cisco Technology, Inc.

( * ) Notice: Subject to any disclaimer, the term of this patent is extended or adjusted under 35 U.S.C. 154(b) by 151 days.

(21) Appl. No.: 18/753,033

(22) Filed: Jun. 25, 2024

(65) Prior Publication Data

US 2025/0392494 A1     Dec. 25, 2025

(51) Int. Cl.
| | |
|---|---|
| *H04L 12/46* | (2006.01) |
| *H04L 47/24* | (2022.01) |
| *H04L 67/10* | (2022.01) |

(52) U.S. Cl.
CPC .......... *H04L 12/4633* (2013.01); *H04L 47/24* (2013.01); *H04L 67/10* (2013.01)

(58) Field of Classification Search
CPC ...... H04L 12/4633; H04L 47/24; H04L 67/10
See application file for complete search history.

(56) References Cited

U.S. PATENT DOCUMENTS

| | | | |
|---|---|---|---|
| 2016/0088092 A1* | 3/2016 | Cardona-Gonzalez | ..................... H04L 67/141 709/227 |
| 2019/0386904 A1 | 12/2019 | Srivatsan et al. | |
| 2020/0106696 A1* | 4/2020 | Michael | .................. H04L 45/24 |
| 2022/0255900 A1 | 8/2022 | Gupta et al. | |
| 2023/0026330 A1 | 1/2023 | Rolando et al. | |
| 2023/0028646 A1 | 1/2023 | Nainar et al. | |
| 2024/0022499 A1 | 1/2024 | Sinha et al. | |
| 2024/0031281 A1 | 1/2024 | Thoria et al. | |

FOREIGN PATENT DOCUMENTS

| | | |
|---|---|---|
| CN | 113285941 A | 8/2021 |

OTHER PUBLICATIONS

European Search Report for European Application No. 25179233.9, dated Oct. 23, 2025, 9 Pages.
Juniper Networks: Contrail Service Orchestration—CSO SD-WAN—Design and Architecture Guide, Engineering Simplicity, Nov. 17, 2022, pp. 1-115, XP093276692, Retrieved from https://www.juniper.net/documentation/us/en/software/cso/sg-007-sd-wan-sd-lan-de sign-arch-guide/sg-007-sd-wan-sd-lan-design-arch-guide.pdf, the whole document.

* cited by examiner

*Primary Examiner* — Bryan Y Lee
(74) *Attorney, Agent, or Firm* — Polsinelli P.C.

(57) ABSTRACT

The present technology provides a software-defined wide area network (SD-WAN) interconnect gateway to connect multiple SaaS clouds based on user intent. The technology dynamically discovers the best possible interconnect gateway to provide access to different cloud services from different geographic locations. A first branch connecting to a first cloud, and a second branch connecting to a second cloud, can now share their respective pathways to the clouds so that both branches can enjoy access to both clouds.

17 Claims, 6 Drawing Sheets

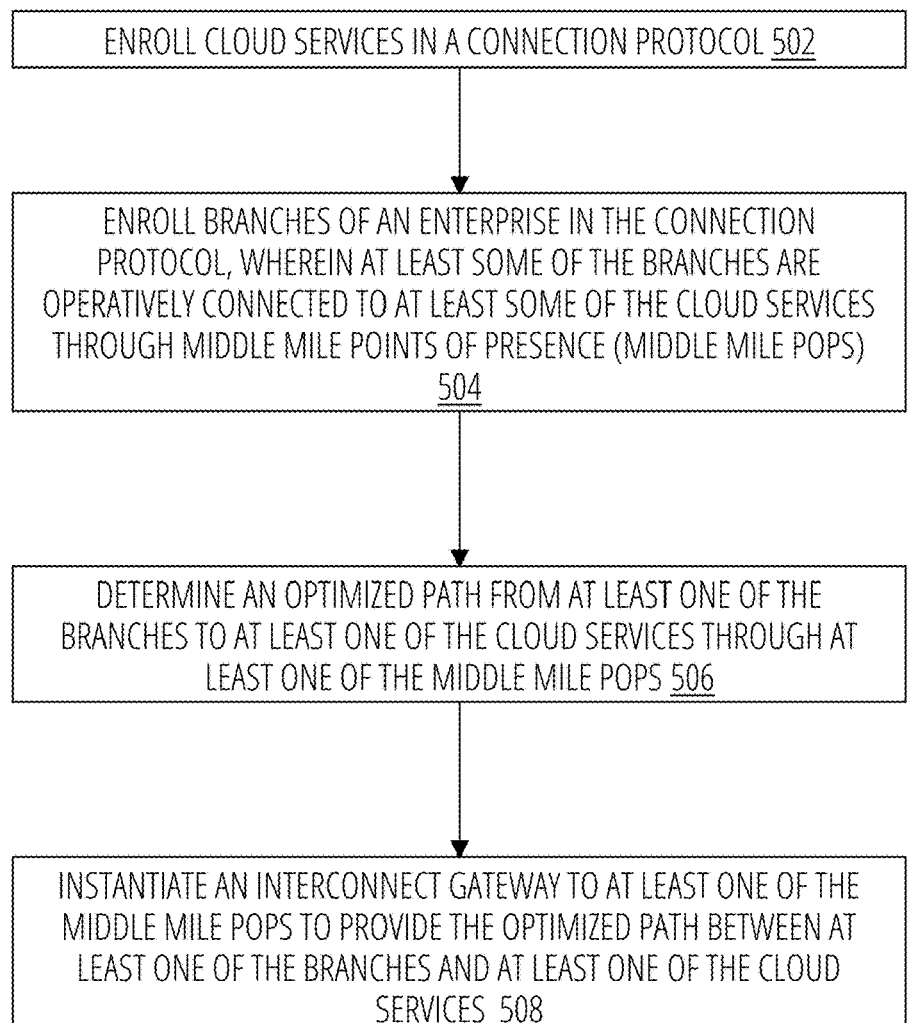

ENROLL CLOUD SERVICES IN A CONNECTION PROTOCOL 502

ENROLL BRANCHES OF AN ENTERPRISE IN THE CONNECTION PROTOCOL, WHEREIN AT LEAST SOME OF THE BRANCHES ARE OPERATIVELY CONNECTED TO AT LEAST SOME OF THE CLOUD SERVICES THROUGH MIDDLE MILE POINTS OF PRESENCE (MIDDLE MILE POPS) 504

DETERMINE AN OPTIMIZED PATH FROM AT LEAST ONE OF THE BRANCHES TO AT LEAST ONE OF THE CLOUD SERVICES THROUGH AT LEAST ONE OF THE MIDDLE MILE POPS 506

INSTANTIATE AN INTERCONNECT GATEWAY TO AT LEAST ONE OF THE MIDDLE MILE POPS TO PROVIDE THE OPTIMIZED PATH BETWEEN AT LEAST ONE OF THE BRANCHES AND AT LEAST ONE OF THE CLOUD SERVICES 508

FIG. 5

FABRIC INTERCONNECT AS A SERVICE IN MIDDLE MILE NETWORK

BACKGROUND

Service Level Agreement (SLA) arrangements have driven Service-as-a-software (SaaS) services to become more prevalent in network computing. This creates the need to enhance network capabilities to expand the geographic reach of WAN fabrics. Current enterprise network architectures do not allow high speed connectivity access to databases in a manner that adequately supports these services.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a routine in accordance with at least some of the presently disclosed embodiments.

DETAILED DESCRIPTION

Figure 1:
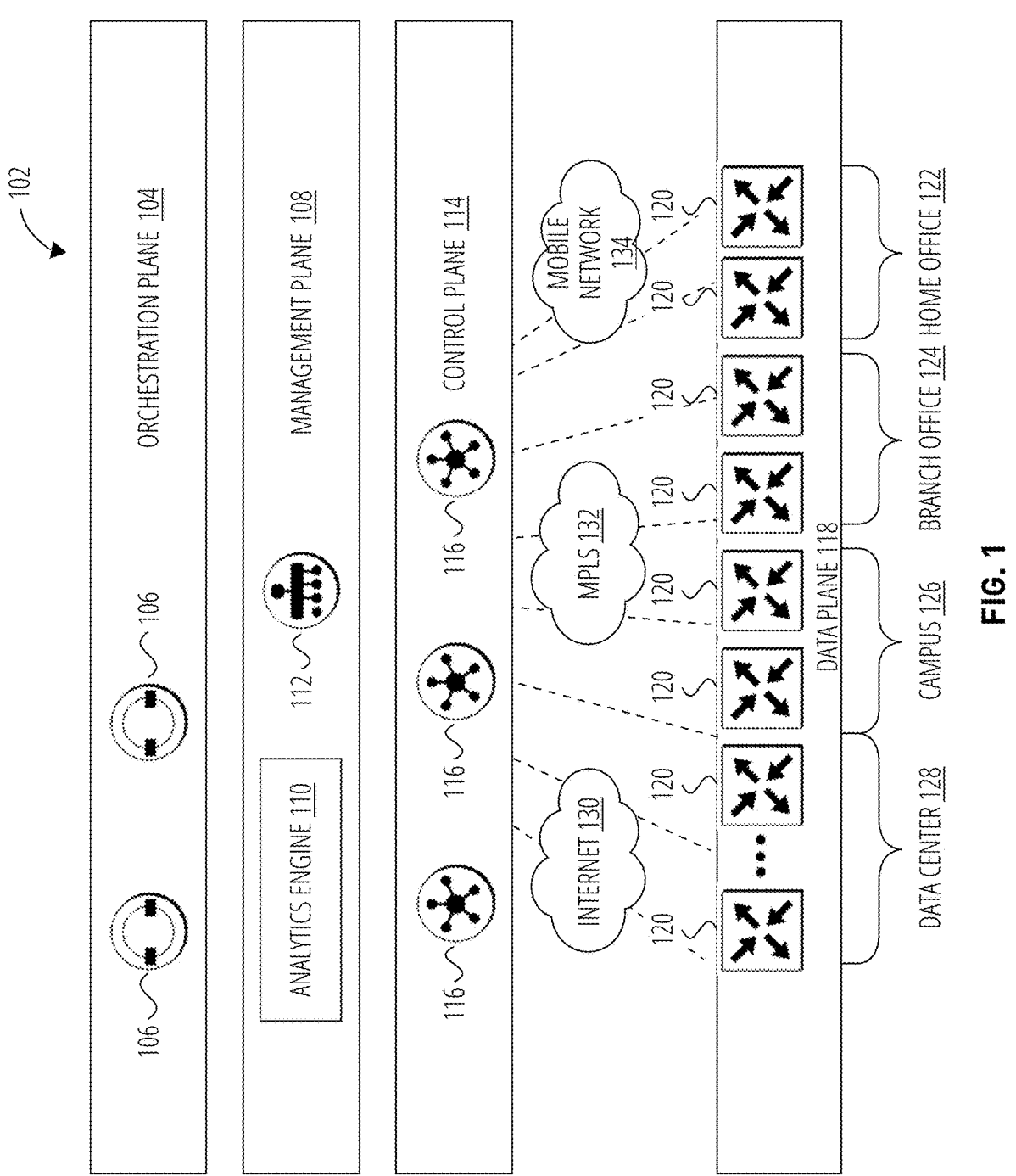
FIG. 1 illustrates an example of a high-level network architecture in accordance with some embodiments of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Helen Keller was once quoted as saying "Alone we can do so little; together we can do so much." Who would have thought this famous quote would extend to the world of network computing? The independent nature of SaaS-based computing has led to duplicative processes being performed by separate networks. A branch in one location can connect to one cloud, while a branch in another location can connect to a different cloud. These branches connect across a middle mile, where connectivity handoffs occur at various points.

However, these middle miles do not interconnect, resulting in both branches performing many of the same processes independently.

There is a need to connect WAN fabrics to leverage connectivity hand offs over middle mile PoPs. This would enable instant, on-demand connectivity from enterprise network fabrics to SaaS clouds. Several entities provide such connectivity hand-offs to leading SaaS providers. However, current enterprise network architectures do not allow high-speed connectivity access to databases in clouds, SaaS applications, data warehousing applications, and supply chains. This becomes problematic because enterprises have offices distributed globally but must connect to critical applications maintained in a centralized location. It is even more challenging for service providers to ensure access with the guaranteed bandwidth specified in their SLAs.

The present technology provides a software-defined wide area network (SD-WAN) interconnect gateway to connect multiple SaaS clouds based on user intent. The technology dynamically discovers the best possible interconnect gateway to provide a branch access to different cloud services from different geographic locations. A first branch connecting to a first cloud, and a second branch connecting to a second cloud, can now share their respective pathways to the clouds so that both branches can enjoy access to both clouds.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example of a network architecture 102 for implementing aspects of the present technology. An example of an implementation of the network architecture 102 is the Cisco® SD-WAN architecture. However, one of ordinary skill in the art will understand that, for the network architecture 102 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 102 can comprise an orchestration plane 104, a management plane 108 with an analytics engine 110, a control plane 114, and a data plane 118. The orchestration plane 104 can assist in the automatic on-boarding of edge network devices 120 (e.g., switches, routers, etc.) in an overlay network. The orchestration plane 104 can include network orchestrator appliances 106. For example, the network orchestrator appliances 106 can be one or more in number, and can be virtual or physical. The network orchestrator appliances 106 can perform the initial authentication of the edge network devices 120 and orchestrate connectivity between devices of the control plane 114 and the data plane 118. In some embodiments, the network orchestrator appliances 106 can also enable communication of devices located behind Network Address Translation (NAT). In some embodiments, physical or virtual Cisco® SD-WAN vBond appliances can operate as the network orchestrator appliances 106.

The management plane 108 can be responsible for central configuration and monitoring of a network. The management plane 108 can include network management appliances 112. For example, the network management appliances 112 can be one or more in number, and can be virtual or physical. In some embodiments, the network management appliances 112 can provide centralized management of the network via a graphical user interface to enable a user to monitor, configure, and maintain the edge network devices 120 and links (e.g., internet transport network 130, MPLS network 132, 4G/Mobile network 134) in an underlay and overlay network. The network management appliances 112 can support multi-tenancy and enable centralized management of logically isolated networks associated with different entities (e.g., enterprises, divisions within enterprises, groups within divisions, etc.). Alternatively or in addition, the network management appliances 112 can be a dedicated network management system for a single entity. In some embodiments, physical or virtual Cisco® SD-WAN vManage appliances can operate as the network management appliances 112.

The control plane 114 can build and maintain a network topology and make decisions on where traffic flows. The control plane 114 can include network control appliances 116. For example, the network control appliances can be one or more in number, and can be virtual or physical. The network control appliances 116 can establish secure connections to each edge network device 120 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 116 can operate as route reflectors. The network control appliances 116 can also orchestrate secure connectivity in the data plane 118 between and among the edge network devices 120. For example, in some embodiments, the network control appliances 116 can distribute crypto key information among the edge network devices 120. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 116.

The data plane 118 can be responsible for forwarding packets based on decisions from the control plane 114. The data plane 118 can include the edge network devices 120, which can be physical or virtual edge network devices. The edge network devices 120 can operate at the edges various network environments of an organization, such as in one or more data centers 128, campus networks 126, branch office networks 124, home office networks 122, and so forth, or in the cloud (e.g., Infrastructure as a Service (IaaS), Platform as a Service (PaaS), SaaS, and other cloud service provider networks). The edge network devices 120 can provide secure data plane connectivity among sites over one or more WAN transports, such as via internet transport networks 130 (e.g., Digital Subscriber Line (DSL), cable, etc., which can be one or more in number), MPLS networks 132 (or other private packet-switched network (e.g., Metro Ethernet, Frame Relay, Asynchronous Transfer Mode (ATM), etc.), mobile networks 134 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 120 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 120.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 2:
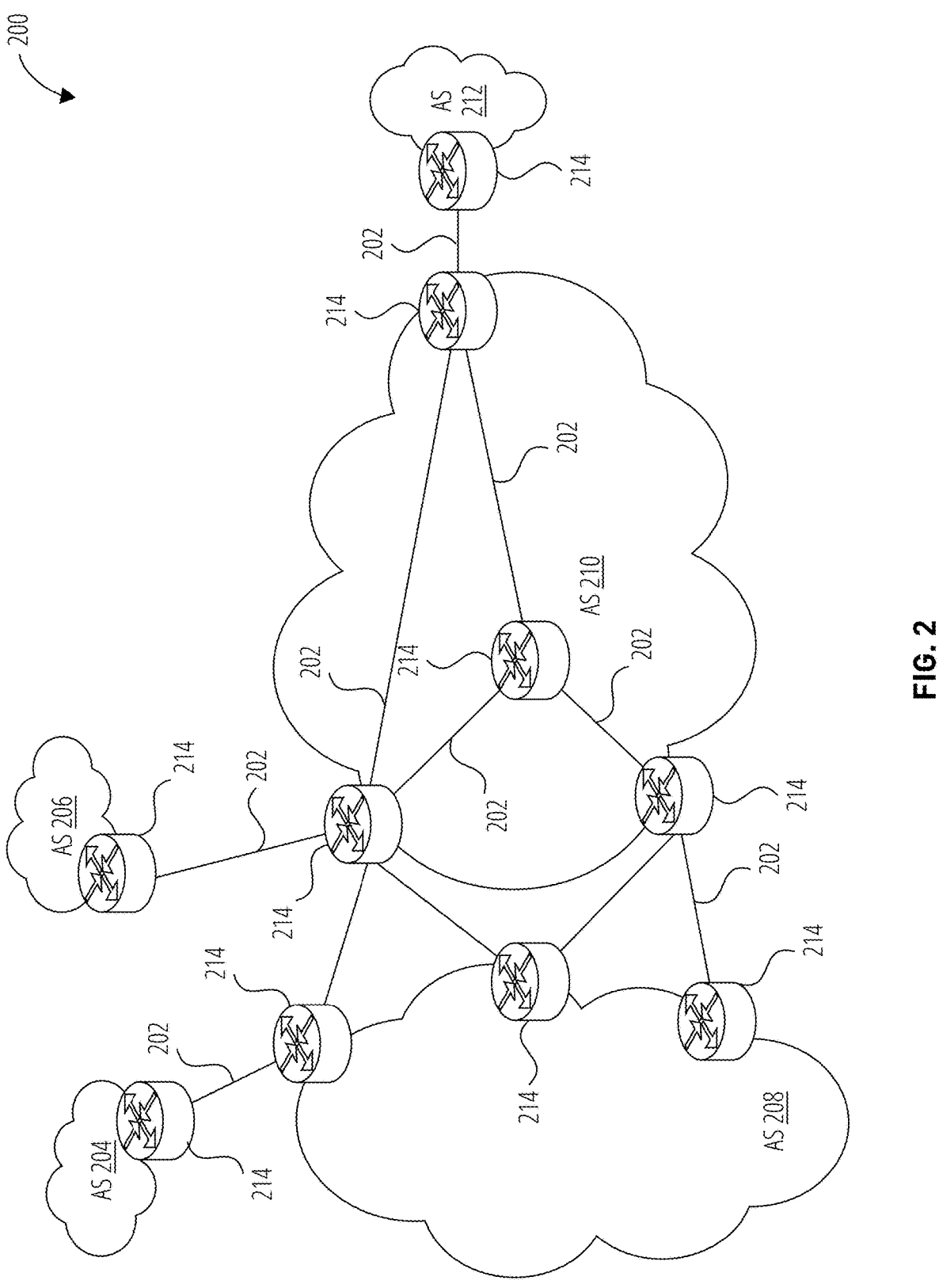
FIG. 2 illustrates an example communication network including one or more autonomous systems (ASes) in accordance with some aspects of the present technology.

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network connection protocols such as certain known wired protocols, as well as wireless protocols or other shared-media protocols where appropriate.

The computer network 200 includes a set of autonomous systems (AS) labeled as AS 204, AS 206, AS 208, AS 210 and AS 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 214 under the control of one or more network operators that presents a common, clearly defined routing policy to a network (e.g., the Internet). Usually, an AS comprises network control appliances 116 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, AS 204, AS 206, AS 208, AS 210, and AS 212 are shown with a limited number of network devices 214. In an actual implementation, however, an AS normally comprises numerous routers, switches, and other elements.

Each of AS 204, AS 206, AS 208, AS 210, and AS 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/ 16". The "/16" indicates that the first 16 bits are used to identify the unique network leaving the remaining bits in the address to identify the specific hosts within this network.

A path joining a plurality of ASes, e.g., links 202, may be referred to as an "AS_PATH." The AS_PATH attribute indicates the list of ASes that must be traversed to reach the address destination. For example, as illustrated in FIG. 2, the AS 212 may store an AS_PATH attribute of "204 206 210 212" where the address destination is the AS 212 (or a particular IP address within AS 212). Here, the AS_PATH attribute indicates that the path to the address destination AS 212 from AS 208 passes through AS 204, AS 206 and AS 210, in that order.

Although it may be preferable that all network devices 214 in each AS 204, AS 206, AS 208, AS 210, and AS 212 be configured according to BGP, in a real-world implementation, it may be unlikely that each network device communicates using BGP. Thus, the disclosed embodiments are applicable to scenarios where all network devices 214 in the computer network 200 are configured according to BGP, as well as scenarios where only a subset of the network devices 214 is configured as such. Moreover, between any of the ASes, there may be a single link 202, e.g., between AS 204 and AS 208, as shown in FIG. 2, or there may be multiple links 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3:
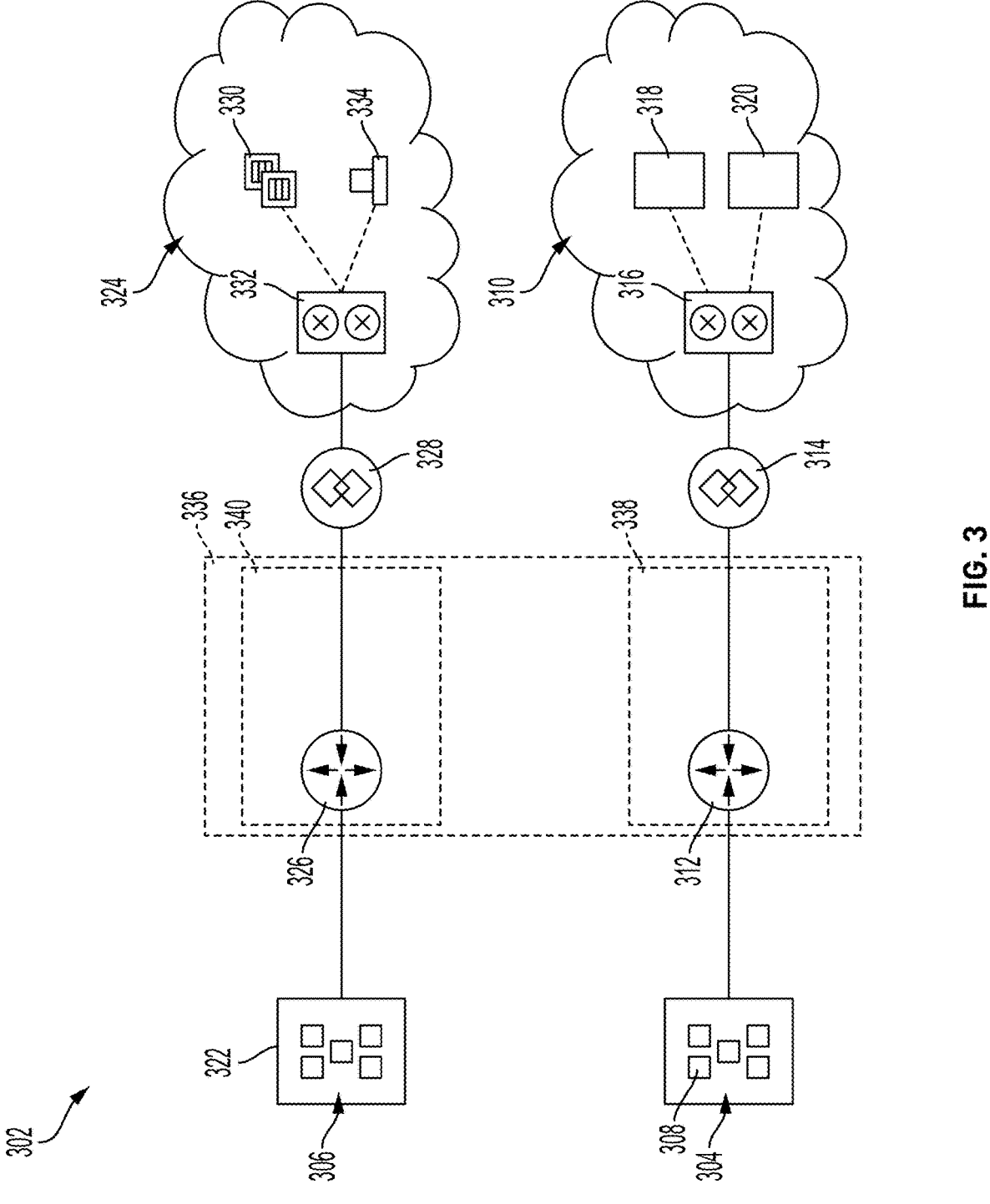
FIG. 3 illustrates a schematic diagram of a network according to at least some of the presently disclosed embodiments.

FIG. 3 illustrates a schematic diagram of a network according to at least some of the presently disclosed embodiments. As shown, a network 302 can include a first network portion 304 and a second network portion 306. The first network portion 304 can include a first branch 308 operatively connected to a first cloud 310 by a first middle mile POP 312 and a first SaaS handoff 314. The first cloud 310 can include, for example, a first cloud service provider 316 that provides services such as customer relationship management (CRM) applications 318 and enterprise resource planning (ERP) applications 320. As one example, Salesforce® can be the entity providing the services shown in the first cloud 310.

The second network portion 306 can include a second branch 322 operatively connected to a second cloud 324 by a second middle mile POP 326 and a second SaaS handoff 328. The second cloud 324 can include, for example, a second cloud service provider 332, databases 330, and client applications 334. As one example, services provided by the Oracle® Cloud Infrastructure (OCI) can be those shown in the second cloud 324.

The first branch 308 and the second branch 322 can be considered physical locations of an organization (e.g., a corporation, governmental entity, university, etc.). For example, the first branch 308 and the second branch 322 can be two separate locations of a bank that are part of the same corporate bank. Or, the first branch 308 and the second branch 322 can be separate offices of a governmental entity, for example, the Detroit and Alexandria offices of the U.S. Patent and Trademark Office. The first branch 308 is operatively connected to the first cloud 310 through the devices and software associated with the first network portion 304. Similarly, the second branch 322 is operatively connected to the second cloud 324 through the devices and software associated with the second network portion 306. But what if the first branch 308 wanted to access the services of the second cloud 324? Or alternatively, what if the second branch 322 wanted to access the services of the first cloud 310?

Prior to the present technology, the first network portion 304 and the second network portion 306 were relatively independent of one another. As a result, it was difficult, cumbersome, and slow for the first branch 308 to access services of the second cloud 324, or the second branch 322 to access services of the first cloud 310. Many times, the first cloud 310/second cloud 324 would be located in a geographic area that was far away from the second branch 306/first branch 308, making connection difficult or impossible. User experience suffered and business was slowed or halted.

With the present technology, cloud service providers can enroll their cloud services in a connection protocol that facilitates connection of different branches to different clouds through various middle mile PoPs. A middle mile PoP is an infrastructure node in a telecommunications network that acts as an intermediary between local access networks (the last mile) and the broader internet backbone (the first mile). These PoPs facilitate efficient routing and transmission of data over long distances to improve network performance across various regions. Often times, middle mile PoPs will be owned by a different entity as compared to other network nodes on the network. There, the middle mile PoP will cooperate with the owner of the other nodes based on a predefined relationship. Harkening back to the words of Helen Keller, "Alone we can do so little; together we can do so much."

One of the first steps to the present technology is for the cloud services to enroll in the connection protocol. There, cloud service providers such as Amazon Web Services® or Oracle Cloud Infrastructure® can list their services as being part of the protocol. The protocol becomes more advantageous as more cloud service providers enroll by allowing the branches greater access to more services. The cloud service providers can enroll in any manner, but in an embodiment, can do so through a user interface that connects to the SD-WAN of the connection protocol. From there, the cloud services can be "discovered" by the SD-WAN controller or manually selected by the branch/enterprise for purposes of routing branches to certain cloud services.

Figure 4:
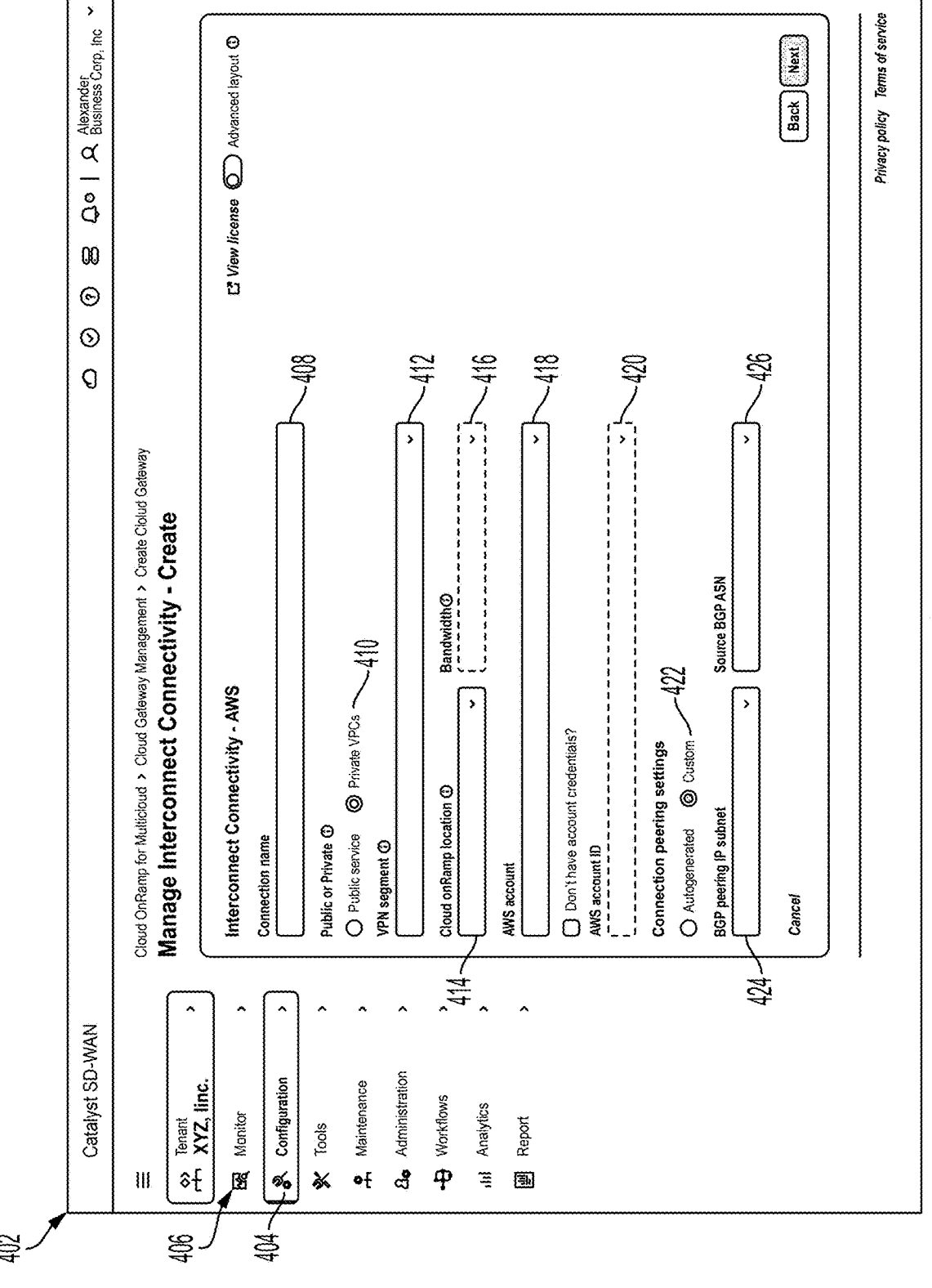
FIG. 4 illustrates a user interface for branch enrollment according to at least some of the presently disclosed embodiments.

The branches may also enroll in the connection protocol. For example, an enterprise (e.g., a corporation, governmental entity, or non-profit organization) may enroll in the connection protocol using a user interface similar to what is shown in FIG. 4. The enterprise can identify each branch that is to be part of the connection protocol and add details regarding those branches. For example, the SD-WAN controller can receive identifying information from the enterprise, including location information of the branches (e.g., media access control (MAC) address, geolocation coordinates, or other geographic identifier), network information (internet protocol (IP) addresses, subnet masks, default gateway, domain name system (DNS) server addresses, virtual local area network (VLAN) IDs, and quality of service (QOS) settings), and service requirement information (e.g., bandwidth amount) from the branches.

As shown in FIG. 3, even before the present technology, at least some of the branches are operatively connected to at least some of the cloud services through middle mile PoPs. For example, the first branch 308 is connected to the first cloud 310 through the first middle mile PoP 312. The present technology, however, determines an optimized path from at least one of the branches to at least one of the cloud services through at least one of the middle mile POPs. For example, the optimized path can be based on a geographic location of at least one of the branches and at least one of the cloud services. The SD-WAN of the connection protocol is vast and includes middle mile PoPs in many different geographic locations. In doing so, the SD-WAN controller can operatively couple branches to services through these many middle mile PoPs by instantiating an interconnect gateway.

The SD-WAN controller can instantiate an interconnect gateway to at least one of the middle mile POPs to provide the optimized path between at least one of the branches and at least one of the cloud services. For example, and as shown in FIG. 3, the first branch 308 can connect to the second cloud 324 through the interconnect provider fabric 336. There, the interconnect provider fabric 336 can connect to a first middle mile POP 312 in a first geographic location 338 (e.g., Chicago) and to a second middle mile POP 326 in a second geographic location 340 (e.g., San Jose). In doing so, the overlay layer of the SD-WAN can create a virtual cross connect or other connection to connect the first branch 308 to the second middle mile POP 326 so that the first branch 308 can access services located on the second network portion 306. Specifically, the interconnect provider fabric 336 can reach the middle mile PoP that connects to the second SaaS handoff 328. In doing so, the first branch 308 can now access the services downstream from the second SaaS handoff 328, i.e., those in the second cloud 324.

The above process allows a branch to connect instantly to other SaaS services, on-demand. By using an interconnect gateway, the limitations of geography are significantly diminished and user satisfaction is improved. In the example above, the interconnect provider fabric 336 allows the Chicago branch to reach services located closer to San Jose, as discussed in the example above. With this technology, both branches can reach both clouds and access a wider variety of services with improved speed.

The branch can specify a maximum bandwidth that is to be allocated to the protocol. For example, the branch can identify a maximum bandwidth to be used in the enrollment phase of the process. For the branch, this can be the maximum amount of bandwidth to be allocated to the interconnect provider fabric 336 for that branch, or can be a maximum amount of bandwidth allocated for specific cloud services. For example, a branch that wishes to reach many cloud services located a large distance away may choose to allocate a large amount of bandwidth to the interconnect provider fabric 336. Conversely, a branch with less of a need for the connection protocol may choose the opposite.

The above process can also be used to increase the bandwidth available to a branch for a particular batch of services. For example, determining the optimized path can include determining that a connection between at least one of the branches and at least one of the cloud services includes insufficient bandwidth. Thereafter, the SD-WAN controller can identify at least one of the middle mile PoPs that would provide increased bandwidth and access to at least one of the cloud services. As a result, the above process can not only provide access to services that were difficult to reach prior to the implementation of this technology. But rather, the technology can further increase the bandwidth available to the branches by instantiating the interconnect gateway to at least one of the middle mile PoPs that would provide increased bandwidth and access to at least one of the cloud services.

The configuration of the branches and services may change over time and without knowledge by the enterprise or branches. For example, the SD-WAN controller may dynamically change the interconnect gateway without user input. The purpose for doing so can be, for example, to improve connectivity between at least one of the branches and at least one of the cloud services. For example, if the second middle mile POP 326 is removed from the network 302, the SD-WAN controller can automatically reconfigure the connection so that the first branch 308 reaches the second cloud 324 through a different middle mile PoP. The SD-WAN controller can do so without any input or knowledge of the enterprise, so that the enterprise can simply identify the requested services and the SD-WAN controller can connect the branch to the services.

FIG. 4 illustrates a user interface for branch enrollment according to at least some of the presently disclosed embodiments. As shown, the interface 402 includes a configuration tab 404 within a menu 406. The configuration tab 404 can lead to an interface that includes several entries for the branch or enterprise to fill in. These entries can help determine the optimized path for connecting the branch to cloud services through the interconnect provider fabric 336. In the example shown in FIG. 4, the entries facilitate a connection to Amazon Web Services®. For example, the entries include a connection name 408, an identification of whether the service is public or private 410, and a VPN segment 412 of the service. The entries can also include a cloud onramp location 414 and a bandwidth 416 that the branch or enterprise wishes to allocate to the services or to the path connecting the branch/enterprise to the cloud that hosts the services.

Of course, the branch or enterprise must have an Amazon Web Services® account to begin with, so the interface 402 includes an entry for the account type 418 in the form of a pull-down menu, and an account identification number 420 or password/login for security purposes.

The interface 402 then includes entries for the user to fill in for network compatibility purposes. For example, the interface 402 includes an entry for whether connection peering settings are to be autogenerated or custom 422, a BGP peering IP subnet 424, and a source BGP ASN 426.

FIG. 5 illustrates a routine in accordance with at least some of the presently disclosed embodiments. In block 502, routine 500 enrolls cloud services in a connection protocol. For example, the SD-WAN controller can enroll cloud services in the connection protocol by receiving information from the cloud service providers and authorization for the protocol to discover or automatically connect to the cloud service providers. Cloud services such as Amazon Web Services® or Salesforce® can enroll in the connection protocol using a user interface, as discussed above in more detail.

In block 504, routine 500 enrolls branches of an enterprise in the connection protocol. For example, the SD-WAN controller can enroll branches of an enterprise in the connection protocol for later connection to cloud services through middle mile PoPs. At least some of the branches are already operatively connected to at least some of the cloud services through middle mile PoPs, but now, the branches can connect to even more services through middle mile PoPs, thanks to the interconnect provider fabric 336.

In block 506, routine 500 determines an optimized path from at least one of the branches to at least one of the cloud services through at least one of the middle mile PoPs. For example, the SD-WAN controller can identify the optimized path based on geographic location, network compatibility, or any other measure.

In block 508, routine 500 instantiates an interconnect gateway to at least one of the middle mile PoPs to provide the optimized path between at least one of the branches and at least one of the cloud services. For example, the SD-WAN controller can instantiate the interconnect gateway, thereby executing the intent of the branch to connect to services that were previously difficult or impossible to reach.

Figure 6:
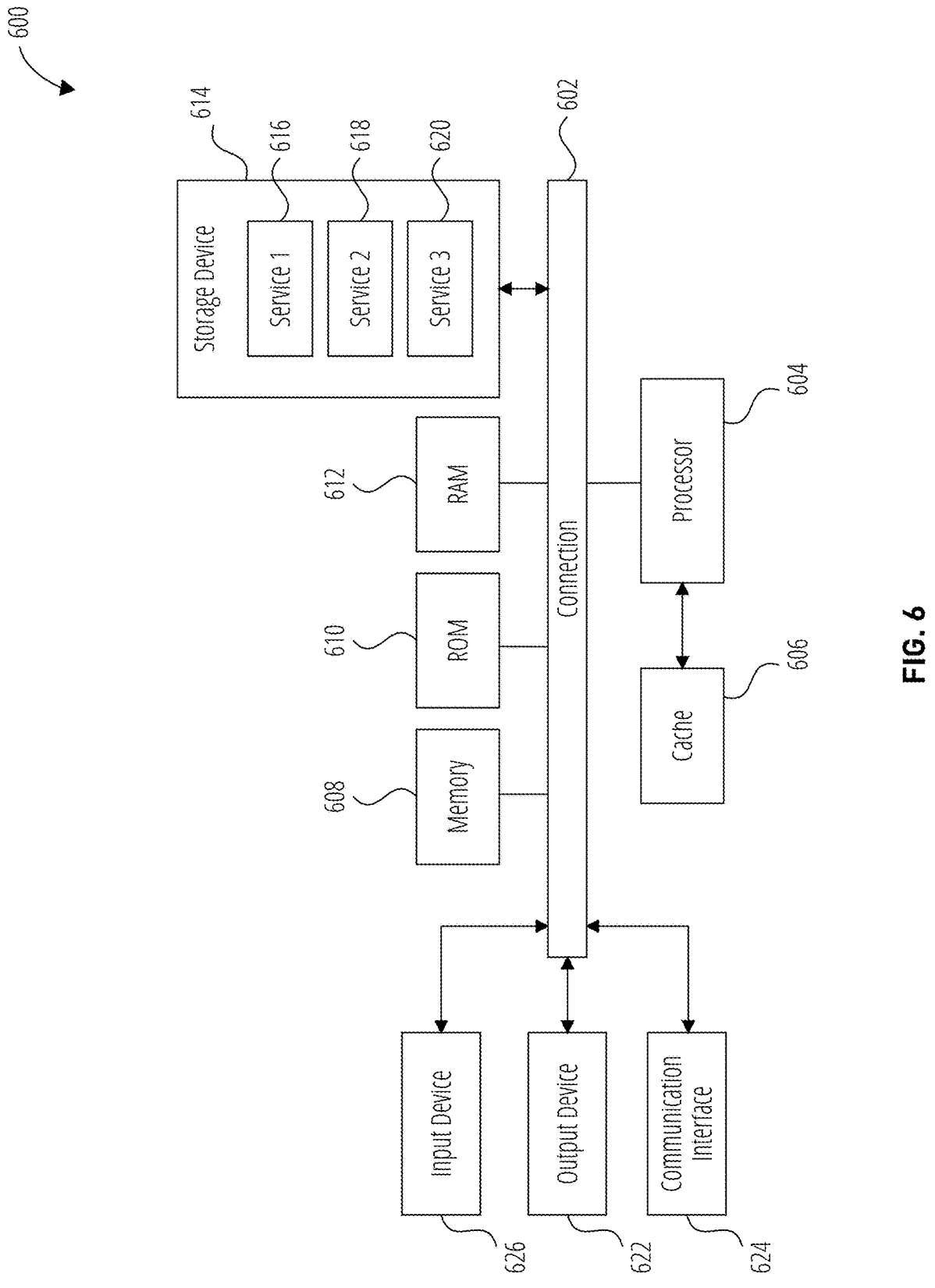
FIG. 6 shows an example of a system for implementing certain aspects of the present technology.

FIG. 6 shows an example of computing system 600, which can be for example any computing device making up the SD-WAN controller, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising enrolling cloud services in a connection protocol; enrolling branches of an enterprise in the connection protocol, wherein at least some of the branches are operatively connected to at least some of the cloud services through middle mile points of presence (middle mile PoPs); determining an optimized path from at least one of the branches to at least one of the cloud services through at least one of the middle mile PoPs; and instantiating an interconnect gateway to at least one of the middle mile PoPs to provide the optimized path between at least one of the branches and at least one of the cloud services.

Aspect 2. The method of Aspect 1, wherein determining the optimized path includes determining that a connection between at least one of the branches and at least one of the cloud services includes insufficient bandwidth; and identifying at least one of the middle mile PoPs that would provide increased bandwidth and access to at least one of the cloud services; and wherein instantiating the interconnect gateway includes instantiating the interconnect gateway to at least one of the middle mile PoPs that would provide the increased bandwidth and the access to at least one of the cloud services.

Aspect 3. The method of Aspect 1, further comprising dynamically changing the interconnect gateway without user input to improve connectivity between at least one of the branches and at least one of the cloud services.

Aspect 4. The method of Aspect 1, wherein enrolling the branches includes receiving identifying information, location information, network information, and service requirement information from the branches.

Aspect 5. The method of Aspect 1, further comprising receiving, from the branches, a bandwidth requirement identifying an amount of bandwidth required by the branches for use of the cloud services.

Aspect 6. The method of Aspect 1, further comprising selecting, by a software-defined wide area network controller (SD-WAN controller), a portion of bandwidth to be allocated to at least one of the branches for connection to at least one of the cloud services.

Aspect 7. The method of Aspect 1, wherein the optimized path is based on a geographic location of at least one of the branches and at least one of the cloud services.

Aspect 8. A controller comprising a storage configured to store instructions; and at least one processor configured to execute the instructions and cause the at least one processor to perform steps comprising: enrolling cloud services in a connection protocol; enrolling branches of an enterprise in the connection protocol, wherein at least some of the branches are operatively connected to at least some of the cloud services through middle mile PoPs; determining an optimized path from at least one of the branches to at least one of the cloud services through at least one of the middle mile PoPs; and instantiating an interconnect gateway to at least one of the middle mile PoPs to provide the optimized path between at least one of the branches and at least one of the cloud services.

Aspect 9. The controller of Aspect 8, wherein determining the optimized path includes: determining that a connection between at least one of the branches and at least one of the cloud services includes insufficient bandwidth; and identifying at least one of the middle mile PoPs that would provide increased bandwidth and access to at least one of the cloud services; and wherein instantiating the interconnect gateway includes instantiating the interconnect gateway to at least one of the middle mile PoPs that would provide the increased bandwidth and the access to at least one of the cloud services.

Aspect 10. The controller of Aspect 8, wherein the instructions further cause dynamically changing the interconnect gateway without user input to improve connectivity between at least one of the branches and at least one of the cloud services.

Aspect 11. The controller of Aspect 8, wherein enrolling the branches includes receiving identifying information, location information, network information, and service requirement information from the branches.

Aspect 12. The controller of Aspect 8, wherein the instructions further cause receiving, from the branches, a bandwidth requirement identifying an amount of bandwidth required by the branches for use of the cloud services.

Aspect 13. The controller of Aspect 8, wherein the instructions further cause selecting, by the controller, a portion of bandwidth to be allocated to at least one of the branches for connection to at least one of the cloud services.

Aspect 14. The controller of Aspect 8, wherein the optimized path is based on a geographic location of at least one of the branches and at least one of the cloud services.

Aspect 15. A non-transitory computer-readable storage medium including instructions that, when executed by at least one processor, cause the at least one processor to perform steps comprising enrolling cloud services in a connection protocol; enrolling branches of an enterprise in the connection protocol, wherein at least some of the branches are operatively connected to at least some of the cloud services through middle mile PoPs; determining an optimized path from at least one of the branches to at least one of the cloud services through at least one of the middle mile PoPs; and instantiating an interconnect gateway to at least one of the middle mile PoPs to provide the optimized path between at least one of the branches and at least one of the cloud services.

Aspect 16. The non-transitory computer-readable storage medium of Aspect 15, wherein determining the optimized path includes: determining that a connection between at least one of the branches and at least one of the cloud services includes insufficient bandwidth; and identifying at least one of the middle mile PoPs that would provide increased bandwidth and access to at least one of the cloud services; and wherein instantiating the interconnect gateway includes instantiating the interconnect gateway to at least one of the middle mile PoPs that would provide the increased bandwidth and the access to at least one of the cloud services.

Aspect 17. The non-transitory computer-readable storage medium of Aspect 15, wherein the instructions further cause dynamically changing the interconnect gateway without user input to improve connectivity between at least one of the branches and at least one of the cloud services.

Aspect 18. The non-transitory computer-readable storage medium of Aspect 15, wherein enrolling the branches includes receiving identifying information, location information, network information, and service requirement information from the branches.

Aspect 19. The non-transitory computer-readable storage medium of Aspect 15, wherein the instructions further cause selecting, by an SD-WAN controller, a portion of bandwidth to be allocated to at least one of the branches for connection to at least one of the cloud services.

Aspect 20. The non-transitory computer-readable storage medium of Aspect 15, wherein the instructions further cause selecting, by a software-defined wide area network controller (SD-WAN controller), a portion of bandwidth to be allocated to at least one of the branches for connection to at least one of the cloud services.

What is claimed is:
1. A method comprising:
enrolling cloud services in a connection protocol;
enrolling branches of an enterprise in the connection protocol, wherein at least one of the branches is operatively connected to at least one of the cloud services through middle mile points of presence (middle mile PoPs);

determining an optimized path from at least one of the branches to at least one of the cloud services through at least one of the middle mile PoPs by determining that a connection between at least one of the branches and at least one of the cloud services includes insufficient bandwidth, and identifying at least one of the middle mile PoPs that would provide increased bandwidth and access to at least one of the cloud services; and instantiating an interconnect gateway to at least one of the middle mile PoPs to provide the optimized path between at least one of the branches and at least one of the cloud services by instantiating the interconnect gateway to at least one of the middle mile PoPs that would provide the increased bandwidth and the access to at least one of the cloud services.

2. The method of claim 1, further comprising dynamically changing the interconnect gateway without user input to improve connectivity between at least one of the branches and at least one of the cloud services.

3. The method of claim 1, wherein enrolling the branches includes receiving identifying information, location information, network information, and service requirement information from the branches.

4. The method of claim 1, further comprising receiving, from the branches, a bandwidth requirement identifying an amount of bandwidth required by the branches for use of the cloud services.

5. The method of claim 1, further comprising selecting, by a software-defined wide area network controller (SD-WAN controller), a portion of bandwidth to be allocated to at least one of the branches for connection to at least one of the cloud services.

6. The method of claim 1, wherein the optimized path is based on a geographic location of at least one of the branches and at least one of the cloud services.

7. A controller comprising:

a storage configured to store instructions; and at least one processor configured to execute the instructions and cause the at least one processor to perform steps comprising:

enrolling cloud services in a connection protocol;

enrolling branches of an enterprise in the connection protocol, wherein at least one of the branches is operatively connected to at least one of the cloud services through middle mile PoPs;

determining an optimized path from at least one of the branches to at least one of the cloud services through at least one of the middle mile PoPs by determining that a connection between at least one of the branches and at least one of the cloud services includes insufficient bandwidth, and identifying at least one of the middle mile PoPs that would provide increased bandwidth and access to at least one of the cloud services; and instantiating an interconnect gateway to at least one of the middle mile PoPs to provide the optimized path between at least one of the branches and at least one of the cloud services by instantiating the interconnect gateway to at least one of the middle mile PoPs that would provide the increased bandwidth and the access to at least one of the cloud services.

8. The controller of claim 7, wherein the instructions further cause dynamically changing the interconnect gateway without user input to improve connectivity between at least one of the branches and at least one of the cloud services.

9. The controller of claim 7, wherein enrolling the branches includes receiving identifying information, location information, network information, and service requirement information from the branches.

10. The controller of claim 7, wherein the instructions further cause receiving, from the branches, a bandwidth requirement identifying an amount of bandwidth required by the branches for use of the cloud services.

11. The controller of claim 7, wherein the instructions further cause selecting, by the controller, a portion of bandwidth to be allocated to at least one of the branches for connection to at least one of the cloud services.

12. The controller of claim 7, wherein the optimized path is based on a geographic location of at least one of the branches and at least one of the cloud services.

13. A non-transitory computer-readable storage medium including instructions that, when executed by at least one processor, cause the at least one processor to perform steps comprising:

enrolling cloud services in a connection protocol;

enrolling branches of an enterprise in the connection protocol, wherein at least one of the branches are operatively connected to at least one of the cloud services through middle mile PoPs;

determining an optimized path from at least one of the branches to at least one of the cloud services through at least one of the middle mile PoPs by determining that a connection between at least one of the branches and at least one of the cloud services includes insufficient bandwidth, and identifying at least one of the middle mile PoPs that would provide increased bandwidth and access to at least one of the cloud services; and instantiating an interconnect gateway to at least one of the middle mile PoPs to provide the optimized path between at least one of the branches and at least one of the cloud services by instantiating the interconnect gateway to at least one of the middle mile PoPs that would provide the increased bandwidth and the access to at least one of the cloud services.

14. The non-transitory computer-readable storage medium of claim 13, wherein the instructions further cause dynamically changing the interconnect gateway without user input to improve connectivity between at least one of the branches and at least one of the cloud services.

15. The non-transitory computer-readable storage medium of claim 13, wherein enrolling the branches includes receiving identifying information, location information, network information, and service requirement information from the branches.

16. The non-transitory computer-readable storage medium of claim 13, wherein the instructions further cause selecting, by an SD-WAN controller, a portion of bandwidth to be allocated to at least one of the branches for connection to at least one of the cloud services.

17. The non-transitory computer-readable storage medium of claim 13, wherein the instructions further cause selecting, by a software-defined wide area network controller (SD-WAN controller), a portion of bandwidth to be allocated to at least one of the branches for connection to at least one of the cloud services.

* * * * *